United States Patent
Ogino et al.

(10) Patent No.: US 9,939,037 B2
(45) Date of Patent: Apr. 10, 2018

(54) LEAF SPRING FRAME MEMBER

(71) Applicants: DAI NIPPON PRINTING CO., LTD., Tokyo-to (JP); ALPS ELECTRIC CO., LTD., Tokyo (JP)

(72) Inventors: Yoshihiko Ogino, Tokyo to (JP); Takahiro Sahara, Tokyo-to (JP); Kyoji Yamamoto, Tokyo-to (JP); Koji Tomita, Tokyo-to (JP)

(73) Assignees: DAI NIPPON PRINTING CO., LTD., Tokyo (JP); ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/898,359

(22) PCT Filed: Jun. 12, 2014

(86) PCT No.: PCT/JP2014/065578
§ 371 (c)(1),
(2) Date: Dec. 14, 2015

(87) PCT Pub. No.: WO2014/200055
PCT Pub. Date: Dec. 18, 2014

(65) Prior Publication Data
US 2016/0146280 A1  May 26, 2016

(30) Foreign Application Priority Data

Jun. 14, 2013 (JP) .................................. 2013-125922
Jun. 14, 2013 (JP) .................................. 2013-125944

(51) Int. Cl.
*F16F 1/18* (2006.01)
*F16F 1/02* (2006.01)
(Continued)

(52) U.S. Cl.
CPC ................ *F16F 1/027* (2013.01); *G02B 7/08* (2013.01); *G02B 13/001* (2013.01); *H04M 1/0264* (2013.01)

(58) Field of Classification Search
CPC .......... G02B 7/04; G02B 7/026; G02B 13/32; G02B 7/08; G02B 7/102; F16F 1/18
(Continued)

(56) References Cited

U.S. PATENT DOCUMENTS

| 2008/0117536 | A1* | 5/2008 | Higuchi ................. G02B 7/102 |
| | | | 359/824 |
| 2009/0122420 | A1* | 5/2009 | Sue .......................... G02B 7/08 |
| | | | 359/696 |
| 2013/0016428 | A1* | 1/2013 | Sugawara ................ G02B 7/08 |
| | | | 359/557 |

FOREIGN PATENT DOCUMENTS

| JP | H11-121680 | 4/1999 |
| JP | 2001-076616 A | 3/2001 |

(Continued)

OTHER PUBLICATIONS

Sep. 9, 2014 Search Report issued in International Patent Application No. PCT/JP2014/065578.
(Continued)

*Primary Examiner* — Pamela Rodriguez
(74) *Attorney, Agent, or Firm* — Oliff PLC

(57) ABSTRACT

A leaf spring frame member (50) comprises: a plurality of leaf spring product parts (11A) each of which includes an outer frame part (11*a*), an inner frame part (11*b*) and spring parts (11*c*); and a support frame (51) which is arranged around the leaf spring product parts (11A) and supports the leaf spring product parts (11A). Each of the leaf spring product parts (11A) and the support frame (51) are connected to each other by connection parts (52). A breaking region (53), which is breakable, is formed in the connection (Continued)

part (52). An outer edge (53*a*) of the breaking region (53) is situated on the inside of an outer edge (11*h*) of the leaf spring product part (11A).

10 Claims, 11 Drawing Sheets

(51) Int. Cl.
*G02B 7/08* (2006.01)
*G02B 13/00* (2006.01)
*H04M 1/02* (2006.01)

(58) Field of Classification Search
CPC .... F16F 1/021; F16F 1/027; F16F 2224/0208; F16F 13/001; H04M 1/0264
USPC .................. 267/158–160; 359/824, 557, 696
See application file for complete search history.

(56) References Cited

FOREIGN PATENT DOCUMENTS

| | | |
|---|---|---|
| JP | 2008-122470 A | 5/2008 |
| JP | 2009-020169 A | 1/2009 |
| JP | 2009-122360 A | 6/2009 |
| JP | 2009-210897 A | 9/2009 |
| JP | 2010-211180 A | 9/2010 |

OTHER PUBLICATIONS

Dec. 15, 2015 International Preliminary Report on Patentability issued in International Patent Application No. PCT/JP2014/065578.

Jul. 3, 2017 Office Action issued in Chinese Patent Application No. 201480033419.5.

Jan. 30, 2018 Office Action issued in Japanese Patent Application No. 2015-522854.

\* cited by examiner

LEAF SPRING FRAME MEMBER

FIELD OF THE INVENTION

The present invention relates to a leaf spring frame member for the manufacture of leaf springs used for drive mechanisms of camera modules.

BACKGROUND ART

For purposes like autofocusing and zooming of a small-sized electronic device with a built-in camera (cellular phone, smartphone, tablet terminal, notebook PC, etc.), for example, there is a known drive mechanism (voice coil motor (VCM)) of a camera module capable of shifting the lens unit in the optical axis direction by use of the interaction between electric current flowing through a coil and a magnetic field of a magnetic circuit formed of a yoke and a magnet.

In such a drive mechanism of a camera module, leaf springs are used in order to support the holder of the lens unit to be shiftable in the optical axis direction of the lens unit.

PRIOR ART LITERATURE

Patent Literature

Patent Literature 1: JP-A-2009-122360

With the progress of the low-profiling of small-sized electronic devices in recent years, camera modules installed in mobile devices are also undergoing low-profiling and miniaturization, and camera modules smaller than ever are starting to be used. Therefore, the leaf springs installed in the camera modules are also being required to be as thin as possible.

Meanwhile, with the increase in the number of pixels of the camera modules, CMOS sensors with 3-5 megapixels, and further, CMOS sensors with 8 megapixels or higher are being manufactured also for camera modules of the autofocusing type. Along with such an increase in the number of pixels, large-diameter lenses are being used in order to improve the performance of the lens installed in the camera module. The spring strength required of the leaf springs varies depending on the weight of the camera lens. Specifically, when a heavy lens is installed, the thickness of each leaf spring has to be increased in order to increase the spring strength of the leaf springs. When a light lens is installed, the thickness of each leaf spring has to be decreased. In such a circumstance, the leaf springs are generally manufactured by means of etching, by using a thin copper alloy high-strength material at a thickness of approximately 20 μm-100 μm.

Incidentally, in the manufacture of the camera module drive mechanism (voice coil motor (VCM)), automatic assembly without the need of manual labor has become common in order to improve assembly accuracy and quality, and operations such as attaching the leaf springs to a device and detaching a support frame after the assembly have been automated.

However, when the leaf springs are supplied to the apparatus that assembles the camera module drive mechanism (voice coil motor (VCM)), the leaf springs, which are small and thin, deforms easily and thus has to be handled with a lot of care. In general, the apparatus is loaded with the leaf springs (product parts) arranged in the support frame (in the state of a leaf spring frame member). Thereafter, the VCM unit is completed by attaching the holder, coil, etc., and then each leaf spring is separated from the support frame (bridge part). The leaf spring (product part) and the support frame (bridge part) are generally connected to each other by connection parts. If the connection strength of the connection parts is decreased, deformation occurs frequently. However, if the strength of the connection parts is increased, the separation (cutting away) of the support frame (bridge part) after the completion of the VCM unit becomes difficult. Further, when the support frame (bridge part) is cut away from the VCM unit, there is a possibility that the cutting position becomes unstable, burrs develop in the connection parts, and the burrs protrude from the outline of the camera module drive mechanism (voice coil motor (VCM)).

The object of the present invention, which has been made in consideration of the above-described situation, is to provide a leaf spring frame member capable of preventing the problem of burrs protruding outward from the outer edge of an outer frame part when the outer frame part of each leaf spring product part and the support frame are cut away from each other.

DISCLOSURE OF THE INVENTION

In accordance with an aspect of the present invention, there is provided a leaf spring frame member for the manufacture of leaf springs used for drive mechanisms of camera modules, comprising: a plurality of leaf spring product parts each of which includes an outer frame part, an inner frame part arranged an the inside of the outer frame part, and a spring part arranged between the inner frame part and the outer frame part; and a support frame which is arranged around the leaf spring product parts and supports the leaf spring product parts. Each of the leaf spring product parts and the support frame are connected to each other by connection parts. A breaking region, which is breakable, is formed in the connection part. An outer edge of the breaking region is situated on the inside of an outer edge of the leaf spring product part.

Preferably, in the leaf spring frame member, notches are formed in parts of the outer frame part situated on both sides of the connection part.

Preferably, in the leaf spring frame member, the breaking region includes a half etching part.

Preferably, in the leaf spring frame member, a bank part, which has not undergone half etching, is formed on each side of the half etching part.

Preferably, in the leaf spring frame member, the width of the bank part is over 0 mm and not more than 0.12 mm.

Preferably, in the leaf spring frame member, the half etching part extends across the entire width of the connection part.

Preferably, in the leaf spring frame member, the breaking region includes a through hole.

Preferably, in the leaf spring frame member, the width of a connection portion of the connection part connected to the leaf spring product part is not less than 0.20 mm and not more than 0.40 mm.

Preferably, in the leaf spring frame member, each of the leaf spring product parts is a leaf spring product part for a lower spring, the outer frame part includes a pair of outer frame members separate from each other, and the inner frame part includes a pair of inner frame members separate from each other.

In accordance with another aspect of the present invention, there is provided a leaf spring frame member for the manufacture of leaf springs used for drive mechanisms of camera modules, comprising: a plurality of leaf spring product parts each of which includes an outer frame part, an inner frame part arranged on the inside of the outer frame part, and a spring part arranged between the inner frame part and the outer frame part; and a support frame which is arranged around the leaf spring product parts and supports the leaf spring product parts. Each of the leaf spring product parts and the support frame are connected to each other by connection parts. A breaking region, which is breakable, is formed in the connection part. A part, where width of the breaking region in the width direction of the connection part reaches a maximum, is situated on the inside of an outer edge of the leaf spring product part.

Preferably, in the leaf spring frame member, the breaking region includes a half etching part.

Preferably, in the leaf spring frame member, the half etching part has a planar shape whose width changes along the length of the connection part.

Preferably, in the leaf spring frame member, the planar shape of the half, etching part is a rhombic shape, an elliptical shape, a hexagonal shape, or a shape including a rectangle and a pair of convex parts each projecting from each side of the rectangle.

Preferably, in the leaf spring frame member, a bank part, which has not undergone half etching, is formed on each side of the half etching part.

Preferably, in the leaf spring frame member, the width of the bank part is over 0 mm and not more than 0.12 mm.

Preferably, in the leaf spring frame member, the half etching part extends across the entire width of the connection part.

Preferably, in the leaf spring frame member, the breaking region includes a through hole.

Preferably, in the leaf spring frame member, notches are formed in parts of the outer frame part situated on both sides of the connection part.

Preferably, in the leaf spring frame member, the width of a connection portion of the connection part connected to the leaf spring product part is not less than 0.20 mm and not more than 0.40 mm.

Preferably, in the leaf spring frame member, each of the leaf spring product parts is a leaf spring product part for a lower spring, the outer frame part includes a pair of outer frame members separate from each other, and the inner frame part includes a pair of inner frame members separate from each other.

According to the present invention, the problem of burrs protruding outward from the outer edge of the outer frame part can be prevented when the outer frame part of each leaf spring product part and the support frame are cut away from each other.

MODE FOR CARRYING OUT THE INVENTION

First Embodiment

A first embodiment of the present invention will be described below with reference to figures. FIGS. 1-11 are schematic diagrams showing the first embodiment of the present invention.

Configuration of Drive Mechanism of Camera Module

Figure 1:
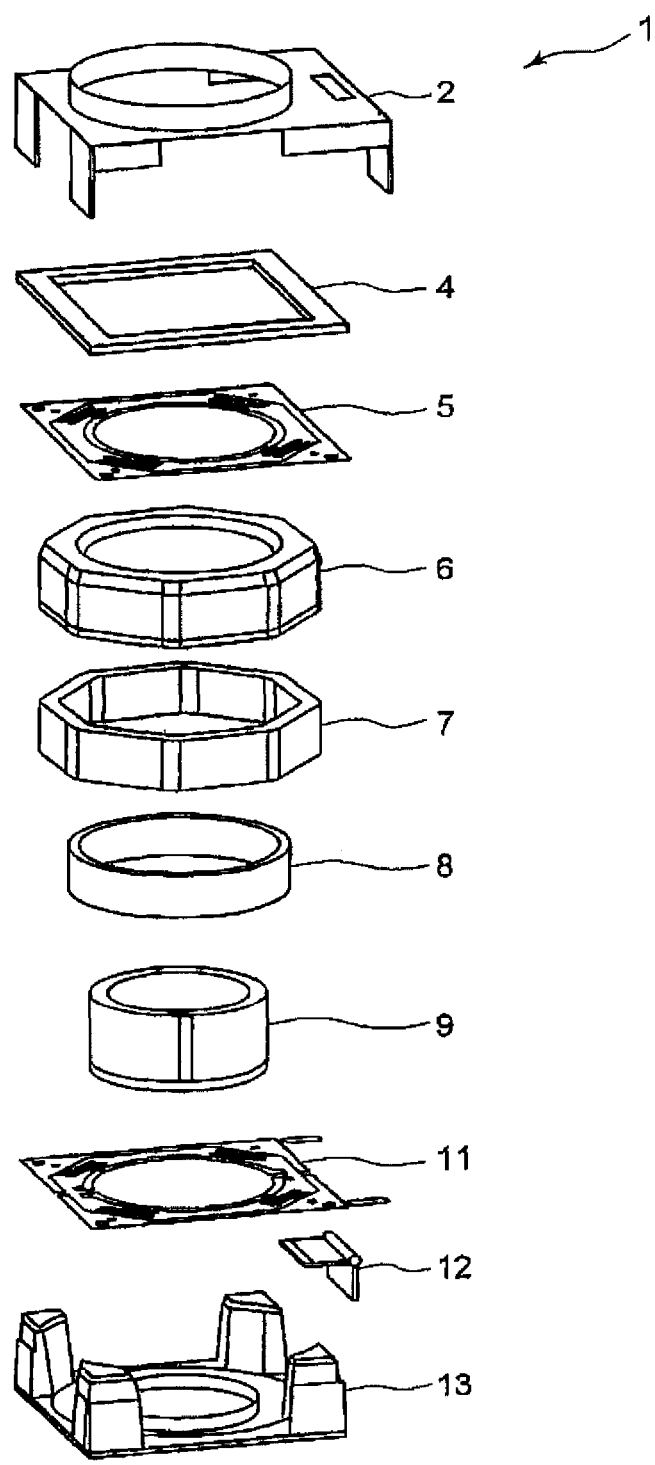
FIG. 1 is an exploded perspective view showing a drive mechanism of a camera module.
Figure 2:
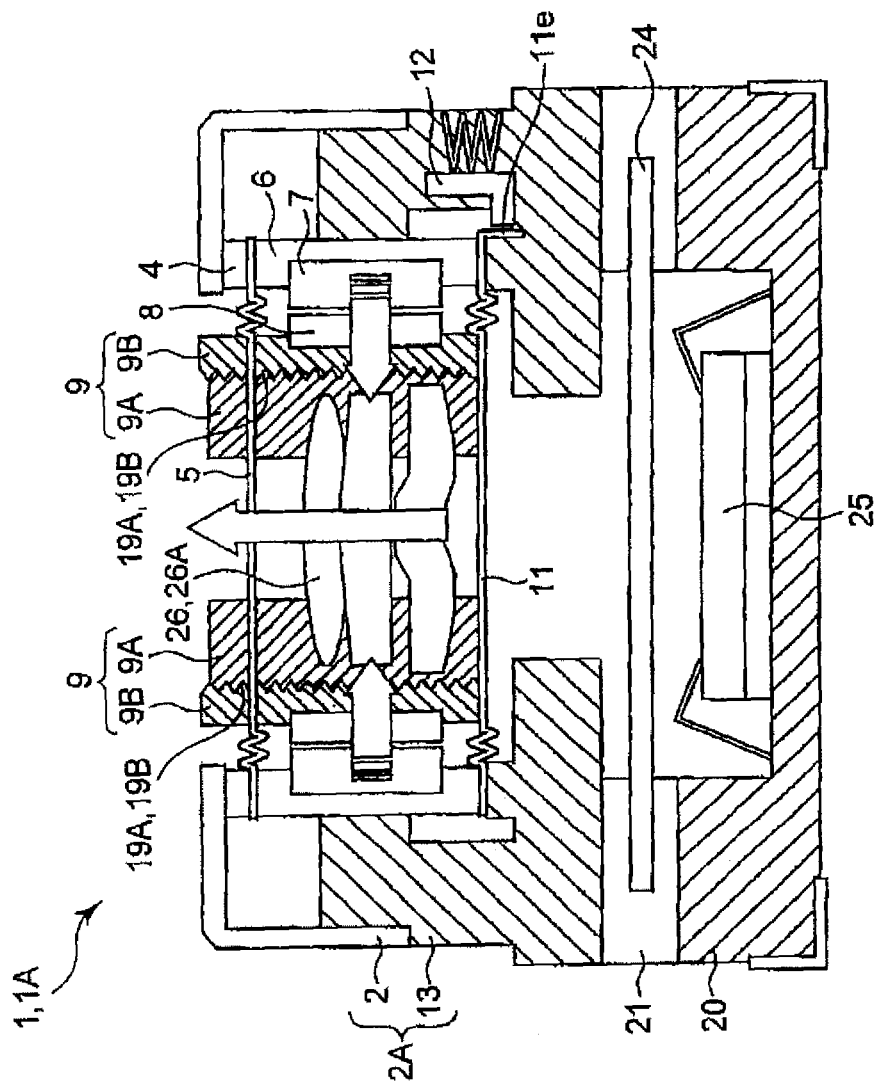
FIG. 2 is a schematic cross-sectional view showing the camera module.

As shown in FIGS. 1 and 2, a drive mechanism 1 of a camera module comprises a casing 2A which is formed of a cover 2 and a base 13, a lens unit 26A which is formed of a plurality of lenses 26 constituting an optical system, a holder 9 which is arranged in the casing 2A to store the lens unit 26A and to be movable in the optical axis direction of the lens unit 26A, a coil 8 which is arranged on the periphery of the holder 9, and a yoke 6 and a magnet piece 7 which are arranged on the base 13 of the casing 2A to supply an electric field to the coil 8.

In the above configuration, the holder 9 storing the lens unit 26A includes an inner holder 9A which stores the lens unit 26A and an outer holder 9B which is arranged outside the inner holder 9A and is provided with the coil 8 on its periphery. An outside thread 19A is formed on the outer circumference of the inner holder 9A, while an inside thread 19B is formed on the inner circumference of the outer holder 9B. The inner holder 9A can be screwed into and attached to the outer holder 9B by having the outside thread 19A of the inner holder 9A engage with the inside thread 19B of the outer holder 9B.

An upper leaf spring 5 is arranged between the cover 2 of the casing 2A and an upper part of the holder 9, while a lower leaf spring 11 is arranged between the base 13 of the casing 2A and a lower part of the holder 9.

By feeding electric current to the coil 8 via the lower leaf spring 11, upward force acting on the holder 9 is caused and the entire lens unit 26A can be lifted up against the force of the upper leaf spring 5 and the lower leaf spring 11 (see FIG. 2).

Further, by adjusting the input electric current, the force uplifting the holder 9 can be changed, and the vertical movement and the position of the holder 9 can be adjusted through the balancing between the uplifting force and the force of the upper leaf spring 5 and the lower leaf spring 11.

As shown in FIG. 2, the casing 2A is fixed over a basis 20 via an intermediate support 21. Infrared cut glass 24 is supported by the intermediate support 21. An image pickup device 25 is arranged on the basis 20.

A camera module 1A is made up of the camera module drive mechanism 1 having the casing 2A as above, the infrared cut glass 24, the intermediate support 21 supporting the infrared cut glass 24, and the basis 20 on which the image pickup device 25 is arranged.

In the above-described configuration, the upper leaf spring 5 (see FIG. 3) includes an outer frame part 5a situated on the casing 2A's side, an inner frame part 5b situated on the holder 9's side, and spring parts 5c having the spring property arranged between the outer frame part 5a and the inner frame part 5b. The lower leaf spring 11 (see FIG. 4) includes an outer frame part 11a situated on the casing 2A's side, an inner frame part 11b situated on the holder 9's side, and spring parts 11c having the spring property arranged between the outer frame part 11a and the inner frame part 11b.

Next, the components of the camera module drive mechanism 1 will be explained in more detail.

As explained above, in the space inside the casing 2A formed of the cover 2 and the base 13, the holder 9 made up of the inner holder 9A holding the lens unit 26A and the outer holder 9B arranged outside the inner holder 9A is stored to be shiftable in the optical axis direction of the lens unit 26A.

The inner frame part 5b of the upper leaf spring 5 and the inner frame part 11b of the lower leaf spring 11 are respectively attached to upper and lower cylinder edge parts of the outer holder 9B of the holder 9. The outer frame part 5a of the upper leaf spring 5 (see FIG. 3) is attached to the top surface of the yoke 6 which is fixed to the base 13 of the casing 2A, while the outer frame part 11a of the lower leaf spring 11 (see FIG. 4) is attached to the base 13 of the casing 2A.

A plurality of magnet pieces 7 are bonded to the yoke 6 to form a magnetic circuit of the camera module drive mechanism 1, and the coil 8 is placed in a magnetic field generated by the magnetic circuit. The coil 8 is wound around the outer circumference of the outer holder 9B of the holder 9. By supplying electric current to the coil 8, the holder 9 can be shifted in the optical axis direction of the lens unit 26A. In FIG. 2, the member indicated by the reference character 12 is a conductor (e.g., flexible printed circuit board) for supplying the electric current from an external power supply to the coil 8 via the lower leaf spring 11. The member indicated by the reference character 4 is an adjustment plate which is attached to the top surface of the upper leaf spring 5. It is also possible to directly connect the lower leaf spring 11 to the external power supply without arranging the conductor 12.

Such a camera module 1A is installed and used in an electronic device terminal such as a small-sized electronic device with a built-in camera (cellular phone, smartphone, tablet terminal, notebook PC, etc.). Such an electronic device terminal is also provided in this embodiment.

Configuration of Leaf Spring

Next, the upper leaf spring 5 and the lower leaf spring 11 will be explained in more detail with reference to FIGS. 3 and 4.

The upper leaf spring 5 and the lower leaf spring 11 are springs made by use of metallic leaf spring material such as copper alloy.

Figure 3:
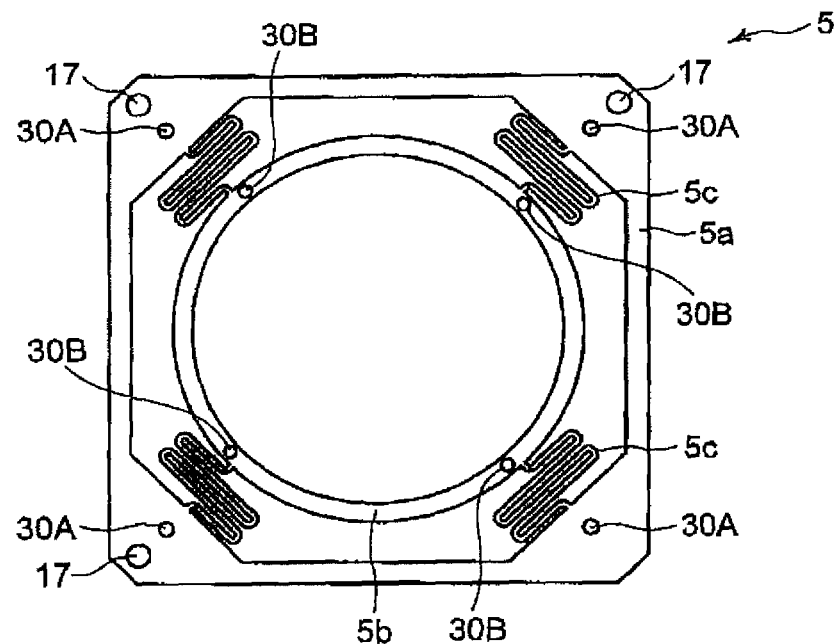
FIG. 3 is a plan view showing an upper leaf spring which is installed in the drive mechanism of the camera module.

As shown in FIG. 3, the upper leaf spring 5 includes the outer frame part 5a in a quadrangular shape, the inner frame part 5b in a ring shape arranged on the holder 9's side and on the inside of the outer frame part 5a, and the spring parts 5c arranged between the outer frame part 5a and the inner frame part 5b and having the spring property for having the outer frame part 5a and the inner frame part 5b expand and contract in the direction of the normal to the upper leaf spring 5.

A positioning hole 17, to be used for the positioning when the upper leaf spring 5 is attached to the top surface of the yoke 6 fixed on the base 13 of the casing 2A, is formed in three of the four corners of the outer frame part 5a. The positioning holes 17 engage with positioning projections (unshown) formed on the top of the yoke 6 and thereby precisely position the upper leaf spring 5 on the top of the yoke 6.

The outer frame part 5a is further provided with bonding parts 30A to be used for attaching the upper leaf spring 5 to the casing 2A. The bonding parts 30A are formed at positions in the four corners of the outer frame part 5a and in the vicinity of connection parts between the outer frame part 5a and the spring parts 5c. Multiple (four) bonding parts 30A are formed at prescribed intervals in the circumferential direction of the outer frame part 5a.

On the other hand, the inner frame part 5b is provided with bonding parts 30B to be used for attaching the upper leaf spring 5 to the holder 9. The bonding parts 30B are formed at positions in the four corners of the inner frame part 5b and in the vicinity of connection parts between the inner frame part 5b and the spring parts 5c. Multiple (four) bonding parts 30B are formed at prescribed intervals in the circumferential direction of the inner frame part 5b.

While each spring part 5c has a meandering shape like a thin line folded multiple times, the shape of the spring part 5c is not restricted to this example. The spring part 5c may be formed in any shape (arcuate shape, S-shape, etc.) as long as the spring property is achieved.

Next, the lower leaf spring 11 will be explained with reference to FIG. 4. Parts of the lower leaf spring 11 (FIG. 4) identical with those of the upper leaf spring 5 (FIG. 3) are assigned the already used reference characters and detailed explanation thereof is omitted for brevity.

Figure 4:
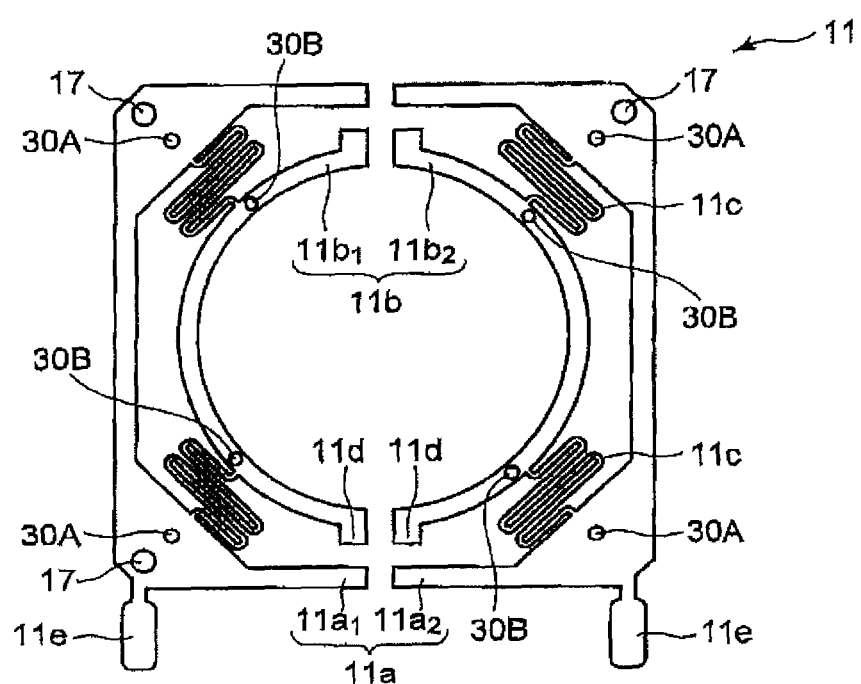
FIG. 4 is a plan view showing a lower leaf spring which is installed in the drive mechanism of the camera module.

As shown in FIG. 4, the lower leaf spring 11 includes the outer frame part 11a in a quadrangular shape, the ring-shaped inner frame part 11b arranged on the outer holder 9B's side of the holder 9 and on the inside of the outer frame part 11a, and the spring parts 11c arranged between the outer frame part 11a and the inner frame part 11b and having the spring property for having the outer frame part 11a and the inner frame part 11b expand and contract in the direction of the normal to the lower leaf spring 11.

In the above components, the outer frame part 11a is provided with bonding parts 30A to be used for attaching the lower leaf spring 11 to the base 13 of the casing 2A. The bonding parts 30A are formed at positions in the four corners of the outer frame part and in the vicinity of connection parts between the outer frame part 11a and the spring parts 11c. Multiple (four) bonding parts 30A are formed at prescribed intervals in the circumferential direction of the outer frame part 11a.

On the other hand, the inner frame part 11b is provided with bonding parts 30B to be used for attaching the lower leaf spring 11 to the holder 9. The bonding parts 30B are formed at positions in the inner frame part 5b in the vicinity of connection parts between the inner frame part 11b and the spring parts 11c. Multiple (four) bonding parts 30B are formed at prescribed intervals in the circumferential direction of the inner frame part 11b.

While each spring part 11c has a meandering shape like a thin line folded multiple times, the shape of the spring part 11c is not restricted to this example. The spring part 11c may be formed in any shape (arcuate shape, S-shape, etc.) as long as the spring property is achieved.

Further, the outer frame part 11a of the lower leaf spring 11 is provided with a pair of connection terminals 11e, 11e to be connected to the external power supply. The connection terminals 11e, 11e are electrically connected to the external power supply by connecting the connection terminals 11e, 11e to the external flexible printed circuit board 12 (FIG. 2) by soldering, for example. The connection terminals 11e, 11e may also be connected by soldering to the basis 20 having a CMOS sensor, etc. mounted thereon.

Furthermore, the inner frame part 11b is provided with a pair of connection terminals 11d, 11d for the electrical connection to the coil 8's side. The connection terminals 11d, 11d are electrically connected to the coil 8 (FIG. 2) by connecting the connection terminals 11d, 11d to the coil 8 by soldering, for example. With the above configuration, electric current can be fed from the external power supply to the coil 8's side via the lower leaf spring 11.

As shown in FIG. 4, the outer frame part 11a is formed of a pair of outer frame members $11a_1$ and $11a_2$ separate from each other, by which the connection terminals 11e, 11e are prevented from short-circuiting. The inner frame part 11b is also formed of a pair of inner frame members $11b_1$ and $11b_2$ separate from each other by which the connection terminals 11d, 11d are prevented from short-circuiting.

In FIGS. 3 and 4, the four spring parts 5c/11c have shapes that are line symmetrical with respect to each central axis of the leaf spring 5/11 extending vertically or horizontally in FIG. 3 or 4. However, the shapes of the four spring parts 5c/11c are not restricted to this example. For example, the four spring parts 5c/11c may also be formed in shapes having 90° rotation symmetry.

While each of the upper and lower leaf springs 5 and 11 has an outer frame part 5a/11a in a substantially quadrangular shape and the outer frame part 5a/11a surrounds the whole circumference of the inner frame part 5b/11b as shown in FIGS. 3 and 4, the outer frame part 5a/11a does not necessarily have to surround the whole circumference of the inner frame part 5b/11b. For example, the outer frame part 5a/11a may be composed of four corner parts (outer frame members) 5s.

Figure 5:
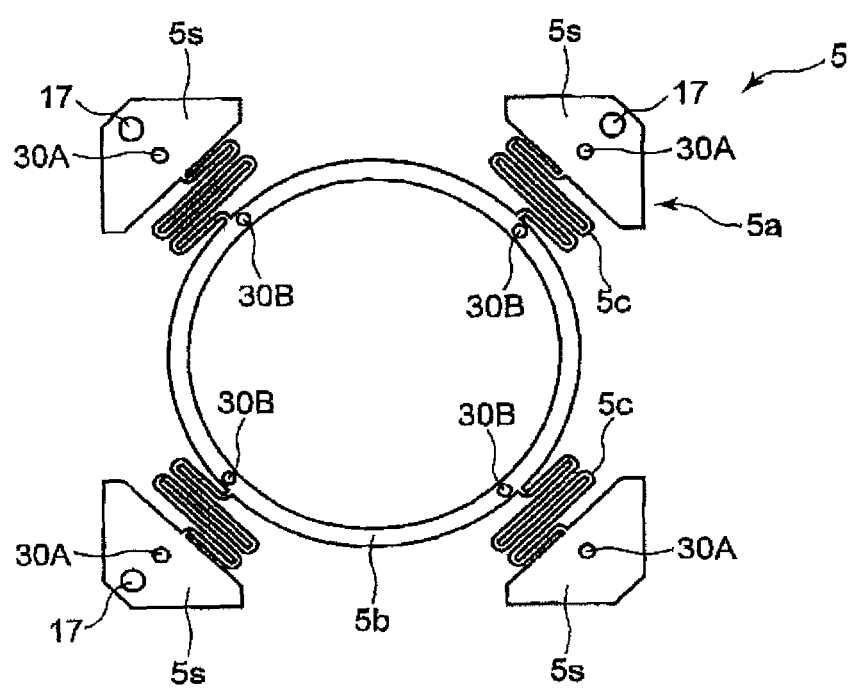
FIG. 5 is a plan view showing a modification of the upper leaf spring.

Here, an upper leaf spring 5 having such an outer frame part 5a composed of four corner parts 5s is shown in FIG. 5. The outer frame part 11a of the lower leaf spring 11 may also be configured to have four corner parts similarly to the outer frame part 5a. Further, the inner frame part 5b/11b also does not have to be formed along the whole circumference. For example, the inner frame part 5b/11b may be composed of multiple (e.g., two to four) inner frame members.

Next, the material of the upper leaf spring 5 and the lower leaf spring 11 will be described. Each of the upper and lower leaf springs 5 and 11 is manufactured by etching a metallic plate made of copper alloy or the like.

In this case, the thicknesses of the upper and lower leaf springs 5 and 11 may be set at 20 μm-100 μm, for example.

Configuration of Leaf Spring Frame Member

Next, a leaf spring frame member which is used for manufacturing the above-described leaf springs will be described below with reference to FIGS. 6, 7(a) and 7(b). The following explanation will be given by using an example of a leaf spring frame member 50 that is used for manufacturing the lower leaf springs 11. Parts in FIGS. 6, 7(a) and 7(b) identical with those in FIGS. 1-5 are assigned the already used reference characters and detailed explanation thereof is omitted for brevity.

Figure 6:
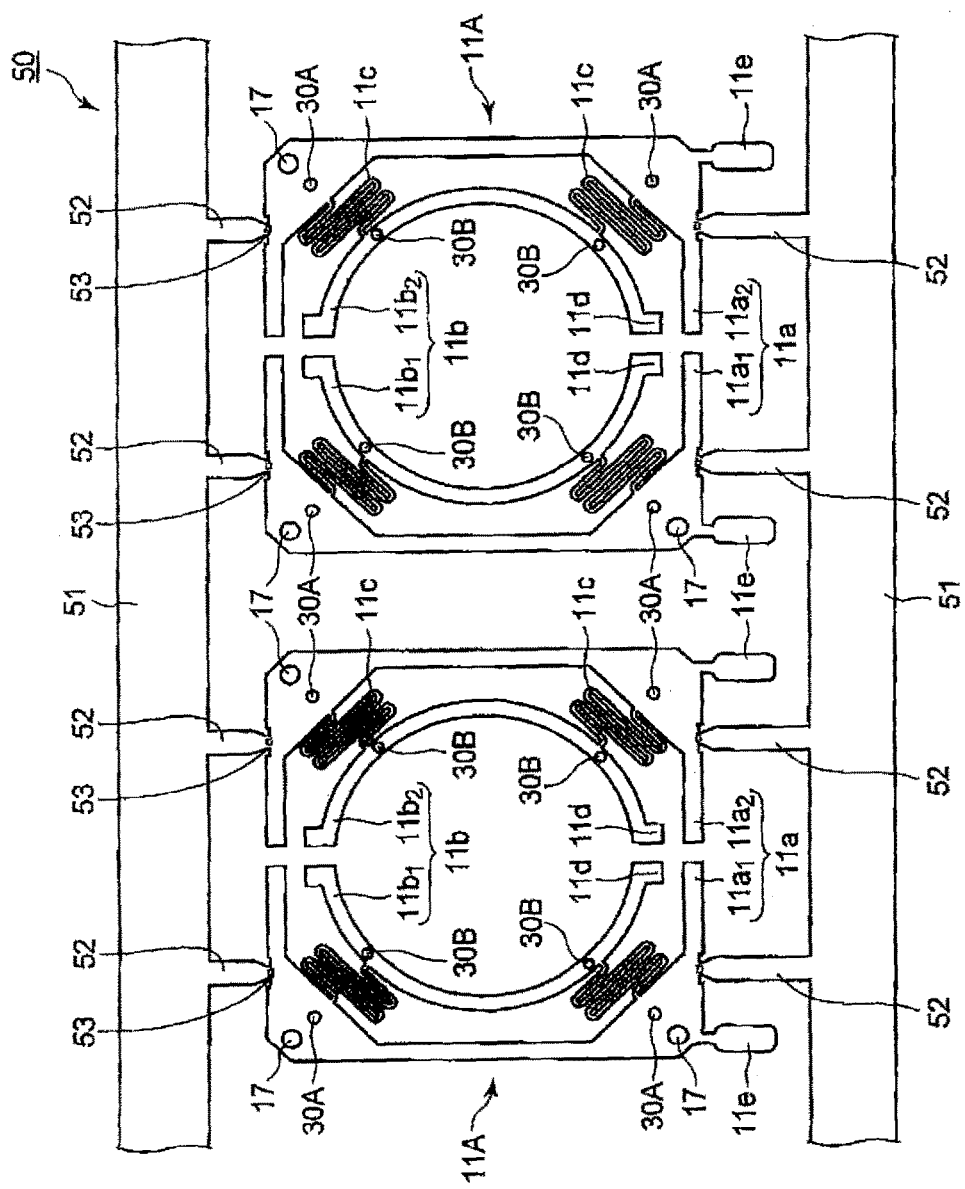
FIG. 6 is a plan view showing a leaf spring frame member according to a first embodiment of the present invention.

As shown in FIG. 6, the leaf spring frame member 50, which is manufactured by etching a metallic plate made of copper alloy or the like, comprises a lot (or plurality) of leaf spring product parts 11A and a support frame 51 supporting the leaf spring product parts 11A.

Each leaf spring product part 11A corresponds to the above-described lower leaf spring 11. The leaf spring product part 11A includes an outer frame part 11a, an inner frame part 11b arranged on the inside of the outer frame part 11a, and spring parts 11c arranged between the inner frame part 11b and the outer frame part 11a. The configuration of the outer frame part 11a, the inner frame part 11b and the spring part 11c has already been explained above, and thus detailed explanation thereof is omitted here.

The support frame 51 is arranged around the leaf spring product parts 11A so as to surround the leaf spring product parts 11A. In FIG. 6, the support frame 51 is arranged along two parallel sides of the outer frame part 11a which is in a substantially quadrangular shape. However, the arrangement of the support frame 51 is not restricted to this example. For example, the support frame 51 may be formed in a lattice-like shape to surround the four sides of each outer frame part 11a in the substantially quadrangular shape.

Further, the outer frame part 11a of each leaf spring product part 11A and the support frame 51 are connected to each other by connection parts 52. The connection parts 52 are cut away from each leaf spring product part 11A (lower leaf spring 11) during or after the assembly of the camera module drive mechanism 1. Incidentally, while each leaf spring product part 11A is connected to the support frame 51 by four connection parts 52 in this embodiment, the number of the connection parts 52 connected to each leaf spring product part 11A is not restricted to four. For example, the number may be set at an integer from 2 to 8.

Next, the configuration of a connection portion between the connection part 52 and the leaf spring product part 11A will be explained further with reference to FIGS. 7(a) and 7(b).

As shown in FIGS. 7(a) and 7(b), the connection part 52 is connected to the outer frame part 11a of the leaf spring product part 11A. The connection part 52 in a long and narrow shape extends orthogonally to one side of the outer frame part 11a. In the connection part 52, the portion connected to the outer frame part 11a of the leaf spring product part 11A may have a shape tapered toward the outer frame part 11a (see FIG. 6). Incidentally, the width $w_1$ of the connection portion of the connection part 52 connected to the outer frame part 11a of the leaf spring product part 11A is desired to be set not less than 0.20 mm and not more than 0.40 mm.

In the connection part 52, a breaking region 53 easily breakable compared to other parts of the connection part 52 is formed. The breaking region 53 may either be formed only in the connection part 52 or to straddle the connection part 52 and the outer frame part 11a.

Figure 11:
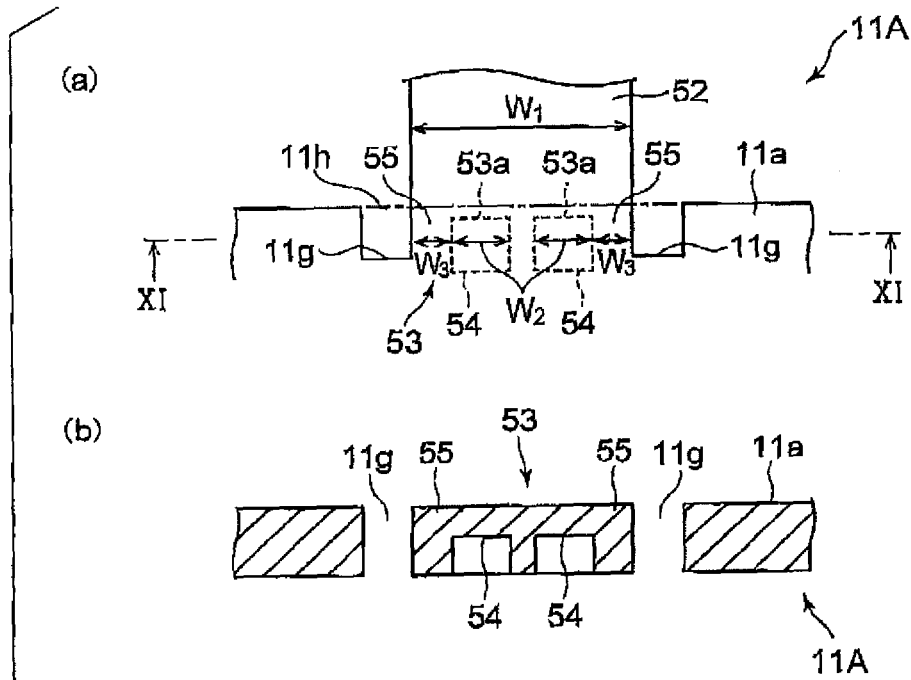
FIG. 11(a) is an enlarged plan view showing another modification of the breaking region.
FIG. 11(b) is a cross-sectional view taken along the line XI-XI in FIG. 11(a).
Figure 12:
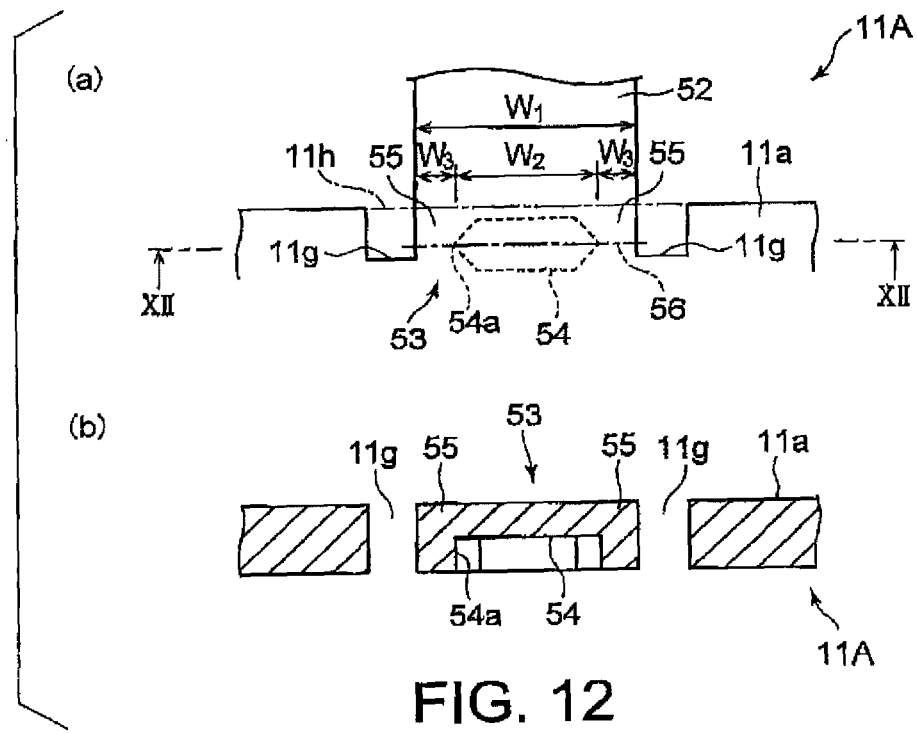
FIG. 12(a) is an enlarged plan view showing a connection portion between a connection part and a leaf spring product part in a second embodiment of the present invention.
FIG. 12(b) is a cross-sectional view taken along the line XII-XII in FIG. 12(a).
Figure 13:
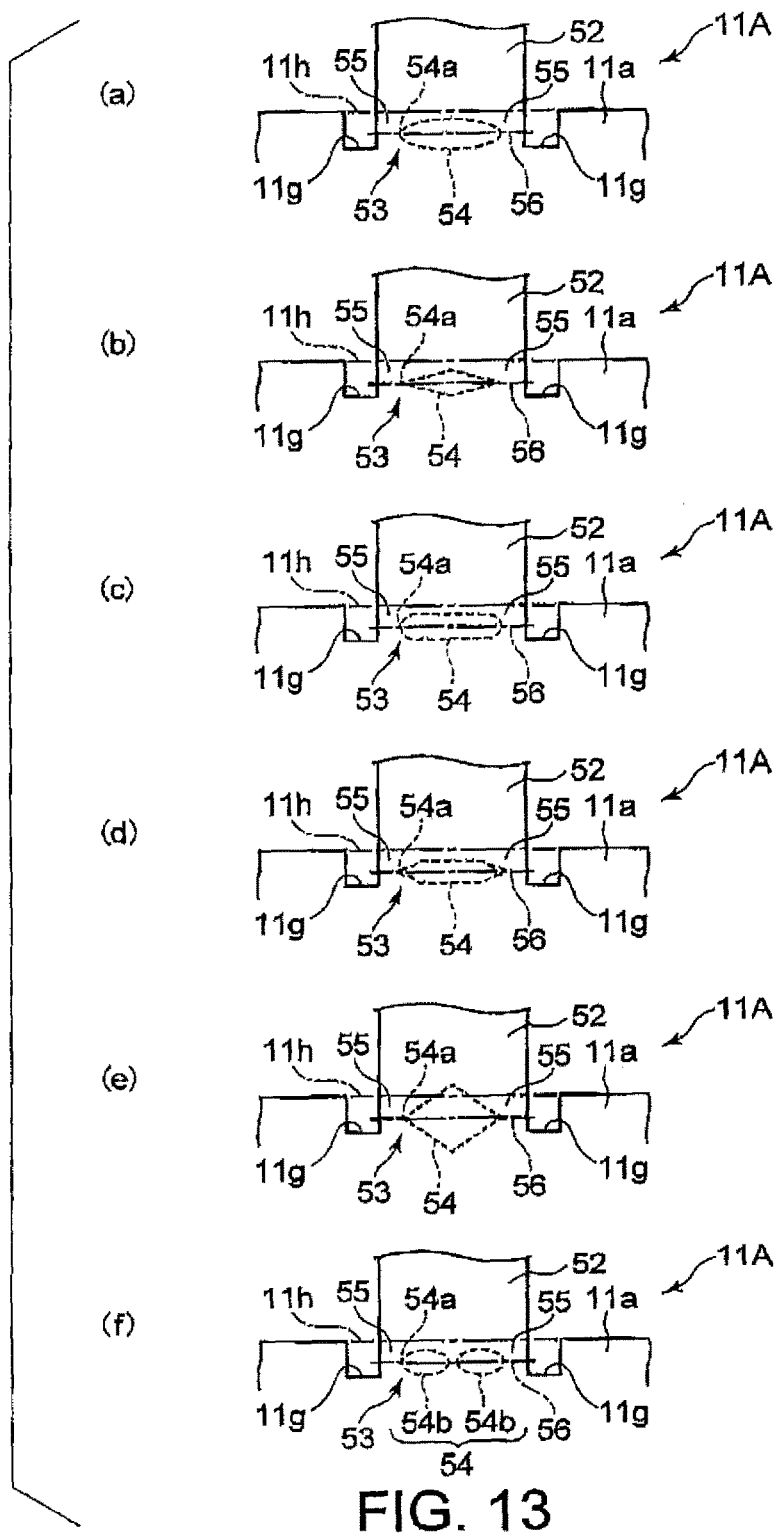
FIGS. 13(a)-13(f) are enlarged plan views showing various modifications of a half etching part.
Figure 14:
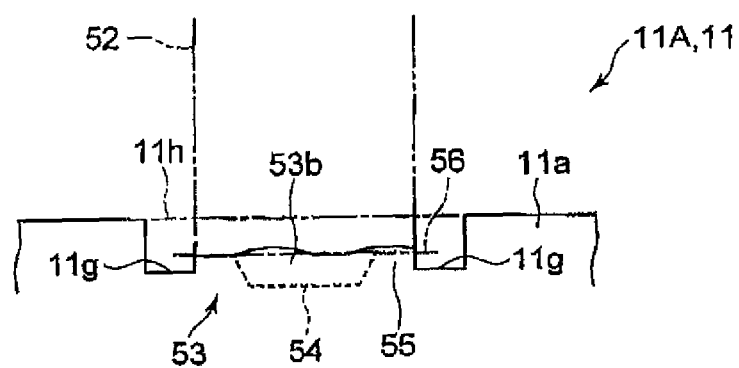
FIG. 14 is an enlarged plan view showing a breaking region after breaking.

In this case, the breaking region 53 includes a half etching part 54. The half etching part 54 has undergone half etching from one surface toward the other surface and has become thinner compared to other parts of the connection part 52 (see FIG. 7(*b*)). The half etching part 54 is formed at the same time (automatically) when the leaf spring frame member 50 is manufactured by etching a metallic plate made of copper alloy or the like. The planar shape (plan-view shape) of the half etching part 54 is not restricted to a substantially rectangular shape (see FIG. 7(*a*)) but can also be a substantially circular shape, a substantially elliptical shape, etc. The width $w_2$ of the half etching part 54 is desired to be not less than 0.04 mm and not more than 0.40 mm. Further, as shown in FIGS. 11(*a*) and 11(*b*), multiple (e.g., two) half etching parts 54 may be arranged in the width direction of the connection part 52, for example. In this case, the width $w_2$ of the half etching parts 54 means the sum total of the widths of the half etching parts 54. Incidentally, the "half etching" means a process of etching the metallic plate (material to be etched) to some midpoint in its thickness direction.

Since the breaking region 53 includes the half etching part 54 as above, this portion becomes the weakest portion against stress such as bending stress and tensile stress. Accordingly, when the outer frame part 11a and the support frame 51 are cut away from each other, the cutting can be made consistently at the breaking region 53, by which the breaking position between the outer frame part 11a and the support frame 51 can be uniformalized among the leaf spring product parts 11A.

Further, a bank part 55 is formed on each side of the half etching part 54 (i.e., each side of the connection part 52 in the width direction). The bank parts 55, which have not undergone the half etching, have the same thickness as the connection part 52. By forming such a pair of bank parts 55, the strength of the part around the breaking region 53 can be prevented from decreasing more than necessary, and unintended detachment of the connection part 52 from the outer frame part 11a can be avoided.

The width $w_3$ of each bank part 55 is desired to be over 0 mm and not more than 0.12 mm. In cases where the plate thickness at the connection part 52 is over 50 µm, the strength of the part around the breaking region 53 never decreases more than necessary even if no bank parts 55 are formed. Thus, the lower limit of the width $w_3$ of the bank part 55 is specified as over 0 mm. In contrast, in cases where the plate thickness at the connection part 52 is 30-50 µm, the holding of the leaf spring product part 11A becomes difficult without a certain width $w_3$ of the bank part 55. In this case, by setting the width $w_3$ of the bank part 55 at a value not more than 0.12 mm, difficulty in the separation of the leaf spring product part 11A and occurrence of variations in the cut surfaces can be prevented.

Figure 7:
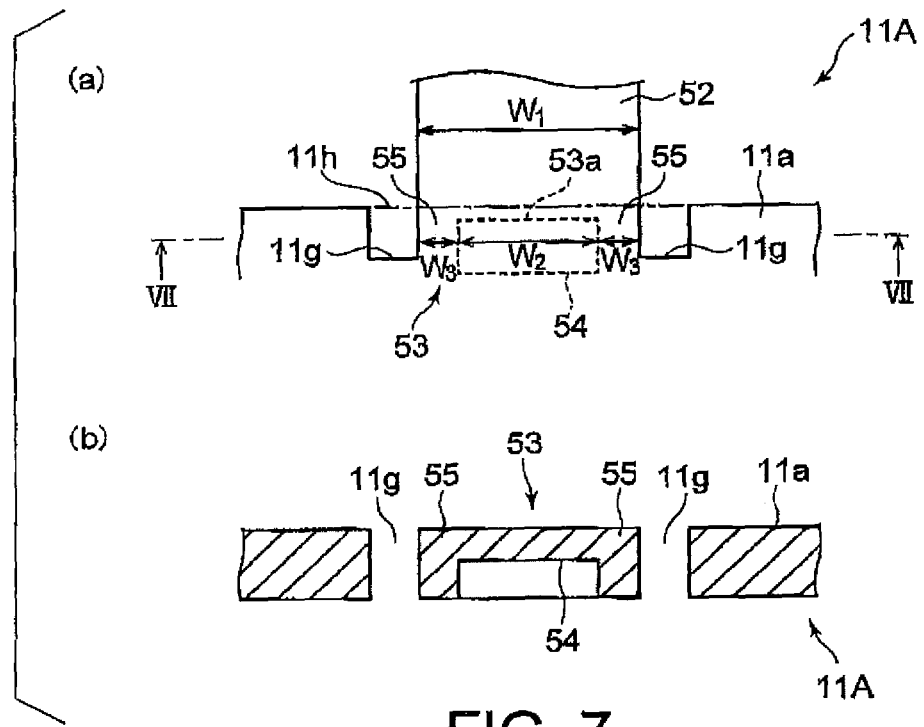
FIG. 7(a) is an enlarged plan view showing a connection portion between a connection part and a leaf spring product part, in the first embodiment of the present invention.
FIG. 7(b) is a cross-sectional view taken along the line VII-VII in FIG. 7(a).
Figure 8:
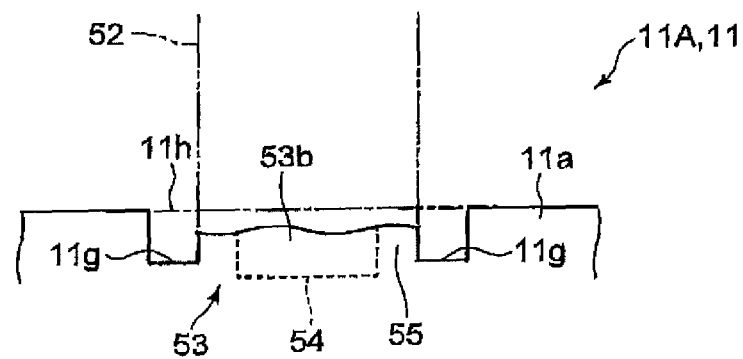
FIG. 8 is an enlarged plan view showing a breaking region after breaking.

Furthermore, as shown in FIG. 7(*a*), the outer edge 53a of the breaking region 53 (outer edge of the half etching part 54) is situated on the inside (i.e., the inner frame part 11b's side) of the outer edge 11h of the leaf spring product part 11A. With this configuration, when the outer frame part 11a and the support frame 51 are cut away from each other, the problem of burrs from the half etching part 54 or the bank parts 55 protruding outward (i.e., to the support frame 51's side) from the outer edge 11h of the leaf spring product part 11A can be prevented.

Moreover, notches 11g are formed in parts of the outer frame part 11a situated on both sides of the connection part 52. Each notch 11g is concave toward the inside of the outer frame part 11a (i.e., toward the inner frame part 11b's side). With this configuration, the problem of the burrs protruding outward (i.e., to the support frame 51's side) from the outer edge 11h of the leaf spring product part 11A can be prevented more reliably when the connection part 52 is cut away from the outer frame part 11a.

Incidentally, the leaf spring frame member 50 may be used for manufacturing either the upper leaf springs 5 or the lower leaf springs 11. However, since the lower leaf spring 11 includes a pair of outer frame members $11a_1$ and $11a_2$ separate from each other and a pair of inner frame members $11b_1$ and $11b_2$ separate from each other, it is more desirable to use such a leaf spring frame member 50 for the manufacture of the lower leaf springs 11 so that the outer frame member $11a_1$ (inner frame member $11b_1$) and the outer frame member $11a_2$ (inner frame member $11b_2$) do not separate further from each other.

Operation of the Embodiment

Next, the operation of this embodiment configured as above will be described below. Specifically, the operation in the manufacture of the camera module drive mechanism 1 will be explained.

First, a plurality of bases 13 having identical configurations with each other are prepared and arranged at prescribed intervals.

Subsequently, a leaf spring frame member 50 is placed on the bases 13 arranged as above. Then, each leaf spring product part 11A of the leaf spring frame member 50 is fixed to a corresponding base 13. In this step, an adhesive agent is applied to the bonding parts 30A formed in the outer frame part 11a of each leaf spring product part 11A, and the outer frame part 11a is bonded and fixed to the base 13.

Subsequently, the outer holder 9B wound with the coil 8 is fixed to each leaf spring product part 11A of the leaf spring frame member 50. In this step, the adhesive agent is applied to the bonding parts 30B formed in the inner frame part 11b of each leaf spring product part 11A, and the inner frame part 11b is bonded and fixed to the outer holder 9B.

Subsequently, the magnet pieces 7 and the yoke 6 are attached to each base 13. Further, a plurality of upper leaf springs 5 are prepared, the outer frame part 5a of each upper leaf spring 5 is attached to the top surface of the yoke 6, and the outer frame part 5a of each upper leaf spring 5 is attached to the outer holder 9B. Then, the adjustment plate 4 is attached to the top surface of each upper leaf spring 5, and the cover 2 is attached to each base 13 and adjustment plate 4.

Subsequently, the lens unit 26A is attached to the casing 2A formed of the cover 2 and the base 13, in this step, the inner holder 9A is screwed into the outer holder 9B while having the outside thread 19A of the inner holder 9A (storing the lens unit 26A) engaged with the inside thread 19B of the outer holder 9B previously fixed to the casing 2A. By the above process, a plurality of camera module drive mechanisms 1 are manufactured integrally.

Thereafter, the camera module drive mechanisms 1 are separated from each other by separating the support frame 51 of the leaf spring frame member 50 from each leaf spring product part 11A by using a cutting device. The lower leaf spring 11 is obtained from each leaf spring product part 11A.

In this step, each connection part 52 is separated from the outer frame part 11a of the leaf spring product part 11A by the breakage of the easily-breakable breaking region 53. When the breaking region 53 breaks, part of the breaking region 53 remains on the leaf spring product part 11A's side (lower leaf spring 11's side) as burrs 53b (see FIG. 8).

However, in this embodiment, the easily-breakable breaking region 53 is formed in the connection part 52 as mentioned above. Thus, the breaking position of the connection part 52 can be stabilized in the separation of the support frame 51 from each leaf spring product part 11A.

Further, as mentioned above, the outer edge 53a of the breaking region 53 is situated on the inside of the outer edge 11h of the leaf spring product part 11A. Therefore, the protrusion of the burrs 53b outward from the outer edge 11h of the leaf spring product part 11A can, be prevented reliably (see FIG. 8) irrespective of where in the breaking region 53 the breaking occurs. With this configuration, the problem of the burrs 53b protruding from the outer surface of the camera module drive mechanism 1 can be prevented and the quality of the camera module drive mechanism 1 can be improved.

In contrast, in the case where the burrs 53b protrude outward from the outer edge 11h of the leaf spring product part 11A (comparative example), a shield cover (unshown) to be put on the camera module 1A might get snagged on the burrs 53b and fall to be normally put on the camera module 1A. Also in cases where the camera module 1A is installed in a device of the type having no shield cover, when the camera module 1A has to be arranged in an extremely small space in a smartphone, cellular phone or the like, the burrs 53b might make contact with the substrate, casing, component or something and disable precise installation of the camera module 1A. Further, a failure can be caused by the burrs 53b contacting the substrate, casing, component or something. In this embodiment, these various problems can be prevented thanks to the above-described prevention of the burrs 53b protruding from the outer surface of the camera module drive mechanism 1.

Operation of Camera Module Drive Mechanism

Next, the operation of the camera module drive mechanism will be described below with reference to FIG. 2.

First, electric current is fed to the coil 8 via the lower leaf spring 11. Due to the interaction between the electric current and the magnetic field of the magnet pieces 7, upward force acts on the holder 9, by which the entire lens unit 26A can be lifted up against the force of the upper leaf spring 5 and the lower leaf spring 11 (see FIG. 2).

Further, by adjusting the electric current fed to the coil 8, the force uplifting the holder 9 can be changed, and the vertical movement and the position of the holder 9 can be adjusted through the balancing between the uplifting force and the force of the upper leaf spring 5 and the lower leaf spring 11.

In this case, the bonding parts 30A are formed at the positions in the outer frame part 5a/11a of the upper/lower leaf spring 5/11 in the vicinity of the connection parts between the outer frame part 5a/11a and the spring parts 11c/11c, and the bonding parts 30B are formed at the positions in the inner frame part 5b/11b in the vicinity of the connection parts between the inner frame part 5b/11b and the spring parts 11c/11c.

By firmly fixing both ends of the spring parts 5c and 11c of the upper and lower leaf springs 5 and 11 to the holder 9, the base 13 and the yoke 6 fixed to the base 13 of the casing 2A as explained above, the spring constants of the spring parts 5c and 11c can be stabilized.

Accordingly, a camera module drive mechanism having stable spring characteristics can be obtained.

As described above, according to this embodiment, the outer edge 53a of the breaking region 53 is situated on the inside of the outer edge 11h of the leaf spring product part 11A, by which the protrusion of the burrs 53b outward from the outer edge 11h of the leaf spring product part 11A can be prevented when the outer frame part 11a of each leaf spring product part 11A and the support frame 51 are cut away from each other.

Modification

In the embodiment described above, the breaking region 53 includes the half etching part 54, and the bank part 55 is formed on each side of the half etching part 54. However, the configuration of the breaking region 53 is not restricted to this example.

For example, as shown in FIGS. 9(a) and 9(b), the breaking region 53 may include a through hole 61 penetrating the connection part 52 in the thickness direction of the connection part 52. In this case, a bank part 55 is formed on each side of the through hole 61. The bank part 55 has the same thickness as the connection part 52. Further, the outer edge 53a of the breaking region 53 (outer edge of the through hole 61) is situated on the inside (i.e., the inner frame part 11b's side) of the outer edge 11h of the leaf spring product part 11A. With this configuration, when the outer frame part 11a and the support frame 51 are cut away from each other, the problem of burrs from the bank parts 55 protruding outward (i.e., to the support frame 51's side) from the outer edge 11h of the leaf spring product part 11A can be prevented. Furthermore, since the parts where the burrs develop can be limited to the bank parts 55, the amount of burrs developing when the connection part 52 is cut away from the outer frame part 11a can be reduced.

Alternatively, as shown in FIGS. 10(a) and 10(b), the half etching part 54 may also be formed to extend across the entire width of the connection part 52. Also in this case, the outer edge 53a of the breaking region 53 (outer edge of the half etching part 54) is situated on the inside (i.e., the inner frame part 11b's side) of the outer edge 11h of the leaf spring product part 11A. With this configuration, when the outer frame part 11a and the support frame 51 are cut away from each other, the problem of burrs from the half etching part 54 protruding outward (i.e., to the support frame 51's side) from the outer edge 11h of the leaf spring product part 11A can be prevented. Further, since the cross-sectional area of the connection part 52 is decreased by the half etching part 54 extending across the entire width of the connection part 52, the amount of burrs developing when the connection part 52 is cut away from the outer frame part 11a can be reduced.

Figure 9:
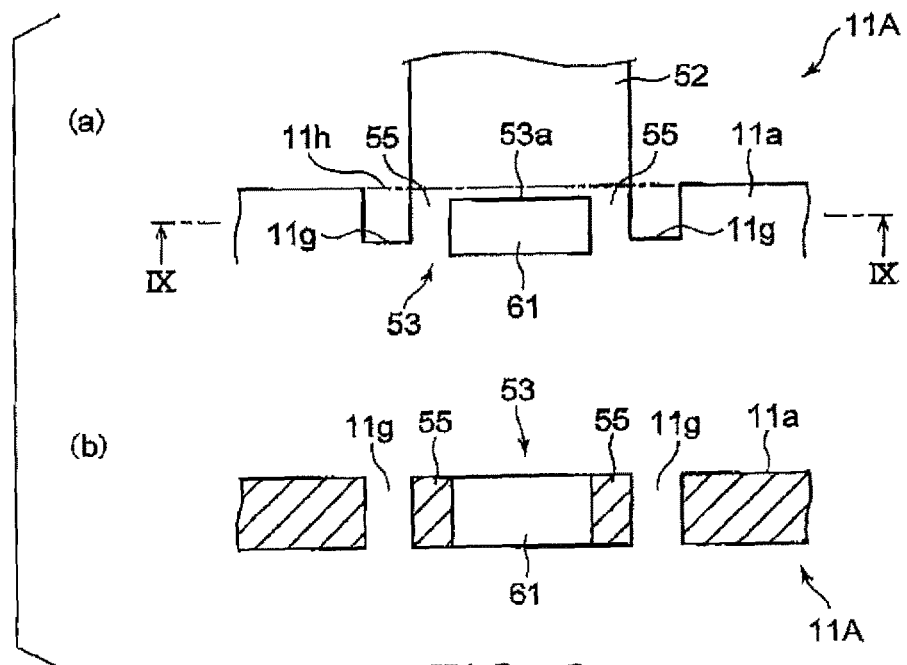
FIG. 9(a) is an enlarged plan view showing a modification of the breaking region.
FIG. 9(b) is a cross-sectional view taken along the line IX-IX in FIG. 9(a).
Figure 10:
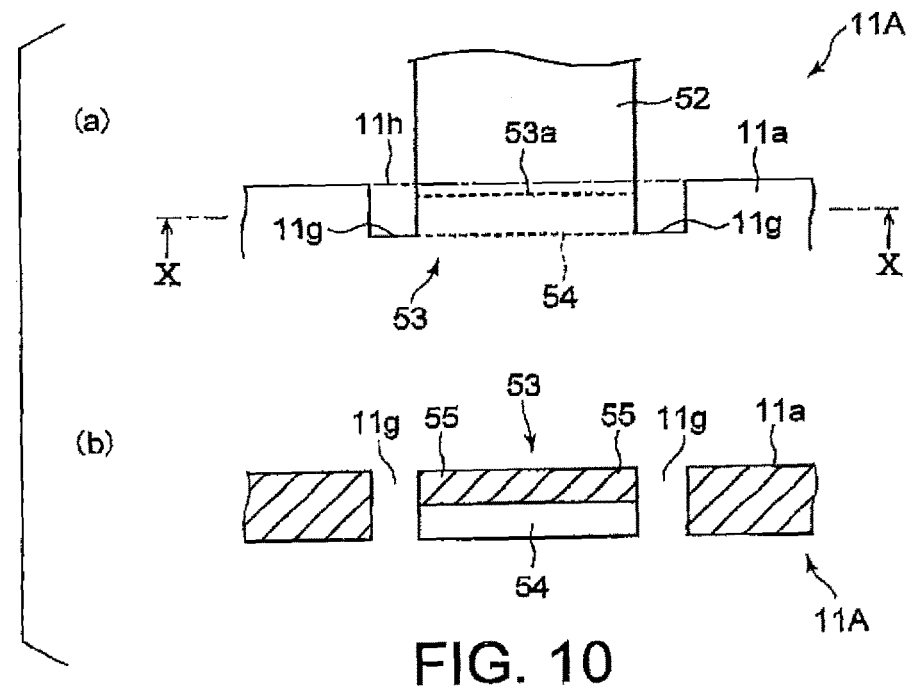
FIG. 10(a) is an enlarged plan view showing another modification of the breaking region.
FIG. 10(b) is a cross-sectional view taken along the line X-X in FIG. 10(a).

Incidentally, parts in FIGS. 9 and 10 identical with those in FIGS. 1-8 are assigned the already used reference characters and detailed explanation thereof is omitted for brevity.

Second Embodiment

Next, a second embodiment of the present invention will be described below with reference to FIGS. 12-16. FIGS. 12-16 are schematic diagrams showing the second embodiment of the present invention. The second embodiment shown in FIGS. 12-16 differs from the first embodiment in the configuration in the breaking regions of the leaf spring frame member. The rest of the configuration is substantially equivalent to that in the first embodiment. Parts in FIGS. 12-16 identical with those in the first embodiment are assigned the already used reference characters and detailed explanation thereof is omitted for brevity.

In FIGS. 12(a) and 12(b), the breaking region 53 includes a breaking plan line 56 to be broken when the support frame 51 is broken away from the outer frame part 11a. The breaking plan line 56, situated at the most weakened (breakable) part in the breaking region 53, is made of a virtual line extending in the width direction of the connection part 52.

The breaking plan line 56 may be in parallel with the rolling direction (metal rolling direction) of the leaf spring material (metallic plate made of metal such as copper alloy) used for manufacturing the leaf spring frame member 50. For example, the rolling direction of the leaf spring material may be aligned with the horizontal direction in FIG. 6. Specifically, when the leaf spring frame member 50 is manufactured, the leaf spring material proceeds in a prescribed rolling direction and is rolled (pressed and extended) by being fed through a gap between rollers, for example. The leaf spring frame member 50 having the prescribed shape is made by etching the rolled leaf spring material. In this case, by setting the breaking plan line 56 in parallel with the rolling direction, the support frame 51 can be broken away with greater ease at the position of the breaking plan line 56.

In this embodiment, the half etching part 54 has a planar shape whose width changes along the length of the connection part 52. In FIG. 12(a), the half etching part 54 is in a substantially hexagonal shape elongated in the width direction of the connection part 52. In this case, the breaking plan line 56 passes through the widest part 54a in the half etching part 54, that is, passes through the left and right apices of the approximate hexagon forming the half etching part 54. The part 54a corresponds to the part that is broken when the support frame 51 is broken away from the outer frame part 11a. Incidentally, the width $w_2$ of the half etching part 54 (i.e., the width at the widest part 54a, that is, the width at the breaking plan line 56) is desired to be not less than 0.04 mm and not more than 0.40 mm.

As explained above, since the breaking region 53 includes the half etching part 54 having a planar shape whose width changes along the length of the connection part 52, the widest part 54a in the half etching part 54 (the part through which the breaking plan line 56 passes) becomes the weakest part against stress such as bending stress and tensile stress. Accordingly, when the outer frame part 11a and the support frame 51 are cut away from each other, the cutting can be made consistently at the breaking plan line 56, by which the breaking position between the outer frame part 11a and the support frame 51 can be uniformalized among the leaf spring product parts 11A.

Further, a bank part 55 is formed on each side of the half etching part 54 (i.e., each side of the connection part 52 in the width direction). The bank parts 55, which have not undergone the half etching, have the same thickness as the connection part 52. By forming such a pair of bank parts 55, the strength of the part around the breaking region 53 can be prevented from decreasing more than necessary, and unintended detachment of the connection part 52 from the outer frame part 11a can be avoided.

The width $w_3$ of each bank part 55 (i.e., the width at the breaking plan line 56) is desired to be over 0 mm and not more than 0.12 mm. In cases where the plate thickness at the connection part 52 is over 50 μm, the strength of the part around the breaking region 53 never decreases more than necessary even if no bank parts 55 are formed. Thus, the lower limit of the width $w_3$ of the bank part 55 is specified as over 0 mm. In contrast, in cases where the plate thickness at the connection part 52 is 30 μm-50 μm, the holding of the leaf spring product part 11A becomes difficult without a certain width $w_3$ of the bank part 55. In this case, by setting the width $w_3$ of the bank part 55 at a value not more than 0.12 mm, difficulty in the separation of the leaf spring product part 11A and occurrence of variations in the cut surfaces can be prevented.

Furthermore, as shown in FIG. 12(a), the breaking plan line 56 is situated on the inside (i.e., the inner frame part 11b's side) of the outer edge 11h of the leaf spring product part 11A. With this configuration, when the outer frame part 11a and the support frame 51 are cut away from each other, the problem of burrs from the half etching part 54 or the bank parts 55 protruding outward (i.e., to the support frame 51's side) from the outer edge 11h of the leaf spring product part 11A can be prevented.

While the explanation of FIG. 12(a) has been given by using an example in which the planar shape of the half etching part 54 is a substantially hexagonal shape, the planar shape of the half etching part 54 is not restricted to this example; the half etching part 54 may be formed to have a variety of planar shapes whose width changes along the length of the connection part 52.

For example, the planar shape of the half etching part 54 can be a substantially elliptical shape as shown in FIG. 13(a), or a substantially rhombic shape as shown in FIG. 13(b).

As shown in FIG. 13(c), the planar shape of the half etching part 54 can also be a shape including a rectangle situated at the center and a pair of convex parts (semicircular parts) each projecting from each side (lateral side) of the rectangle (race track shape).

As shown in FIG. 13(d), the planar shape of the half etching part 54 can also be a shape including a rectangle situated at the center and a pair of convex parts (each of which has a shape made by overlaying a small semicircle on a large semicircle) each projecting from each side (lateral side) of the rectangle.

As shown in FIG. 13(e), the planar shape of the half etching part 54 can also be a substantially rhombic shape having a part protruding outward (i.e., to the support frame 51's side) from the outer edge 11h of the leaf spring product part 11A.

As shown in FIG. 13(f), the half etching part 54 can also be made up of multiple (e.g., two) half etching portions 54b. In this case, the widest part 54a in the half etching part 54 means a part where the sum total of the widths of the multiple half etching portions 54b in the width direction of the connection part 52 is the greatest.

Incidentally, in each of the examples shown in FIGS. 13(a)-13(f), the breaking plan line 56 passes through the widest part 54a in the half etching part 54 and is situated on the inside (i.e., the inner frame part 11b's side) of the outer edge 11h of the leaf spring product part 11A.

The operation of this embodiment is substantially equivalent to the above-described operation of the first embodiment.

Specifically, when the support frame 51 of the leaf spring frame member 50 is separated from each leaf spring product part 11A by using the cutting device, the breaking region 53 breaks along the breaking plan line 56, by which the connection part 52 is separated from the outer frame part 11a of the leaf spring product part 11A. In this case, part of the breaking region 53 remains on the leaf spring product part 11A's side (lower leaf spring 11's side) as burrs 53b (see FIG. 14).

In this embodiment, the easily-breakable breaking region 53 is formed in the connection part 52 and the breaking region 53 has the breaking plan line 56 to be broken at the time of the breaking as explained above. Thus, the breaking position of the connection part 52 can be stabilized in the separation of the support frame 51 from each leaf spring product part 11A.

Further, as mentioned above, the breaking plan line 56 is situated on the inside of the outer edge 11h of the leaf spring product part 11A. Therefore, the protrusion of the burrs 53b outward from the outer edge 11h of the leaf spring product part 11A can be prevented reliably (see FIG. 14) at the time of the breaking along the breaking plan line 56.

With this configuration, the problem of the burrs 53b protruding from the outer surface of the camera module drive mechanism 1 can be prevented and the quality of the camera module drive mechanism 1 can be improved.

As described above, according to this embodiment, the breaking plan line 56 is situated on the inside of the outer edge 11h of the leaf spring product part 11A, by which the protrusion of the burrs 53b outward from the outer edge 11h of the leaf spring product part 11A can be prevented when the outer frame part 11a of each leaf spring product part 11A and the support frame 51 are cut away from each other. Besides, effects similar to those of the first embodiment can be achieved.

Modification

In this embodiment, the breaking region 53 includes the half etching part 54, and the bank part 55 is formed on each side of the half etching part 54. However, the configuration of the breaking region 53 is not restricted to this example.

For example, as shown in FIGS. 15(a) and 15(b), the breaking region 53 may include a through hole 61 penetrating the connection part 52 in the thickness direction of the connection part 52. In this case, a bank part 55 is formed on each side of the through hole 61. The bank part 55 has the same thickness as the connection part 52. The through hole 61 has a planar shape whose width changes along the length of the connection part 52, and the planar shape is a substantially hexagonal shape elongated in the width direction of the connection part 52. In this case, the breaking plan line 56 passes through the widest part 61a of the through hole 61 in the substantially hexagonal shape. Thus, the part 61a corresponds to the part that is broken when the support frame 51 is broken away from the outer frame part 11a.

Further, the breaking plan line 56 is situated on the inside (i.e., the inner frame part 11b's side) of the outer edge 11h of the leaf spring product part 11A. With this configuration, when the outer frame part 11a and the support frame 51 are cut away from each other, the problem of burrs from the bank parts 55 protruding outward (i.e., to the support frame 51's side) from the outer edge 11h of the leaf spring product part 11A can be prevented. Furthermore, since the parts where the burrs develop can be limited to the bank parts 55, the amount of burrs developing when the connection part 52 is cut away from the outer frame part 11a can be reduced.

In FIGS. 15(a) and 15(b), the planar shape of the through hole 61 is not restricted to the substantially hexagonal shape. For example, the through hole 61 may be formed to have a variety of planar shapes like the aforementioned half etching parts 54 shown in FIGS. 13(a)-13(f).

Alternatively, as shown in FIGS. 16(a) and 16(b), the half etching part 54 may also be formed to extend across the entire width of the connection part 52. In this case, the breaking plan line 56 passes over the half etching part 54. Further, the breaking plan line 56 is situated on the inside (i.e., the inner frame part 11b's side) of the outer edge 11h of the leaf spring product part 11A. With this configuration, when the outer frame part 11a and the support frame 51 are cut away from each other, the problem of burrs from the half etching part 54 protruding outward (i.e., to the support frame 51's side) from the outer edge 11h of the leaf spring product part 11A can be prevented. Furthermore, since the cross-sectional area of the connection part 52 is decreased by the half etching part 54 extending across the entire width of the connection part 52, the amount of burrs developing when the connection part 52 is cut away from the outer frame part 11a can be reduced.

Figure 15:
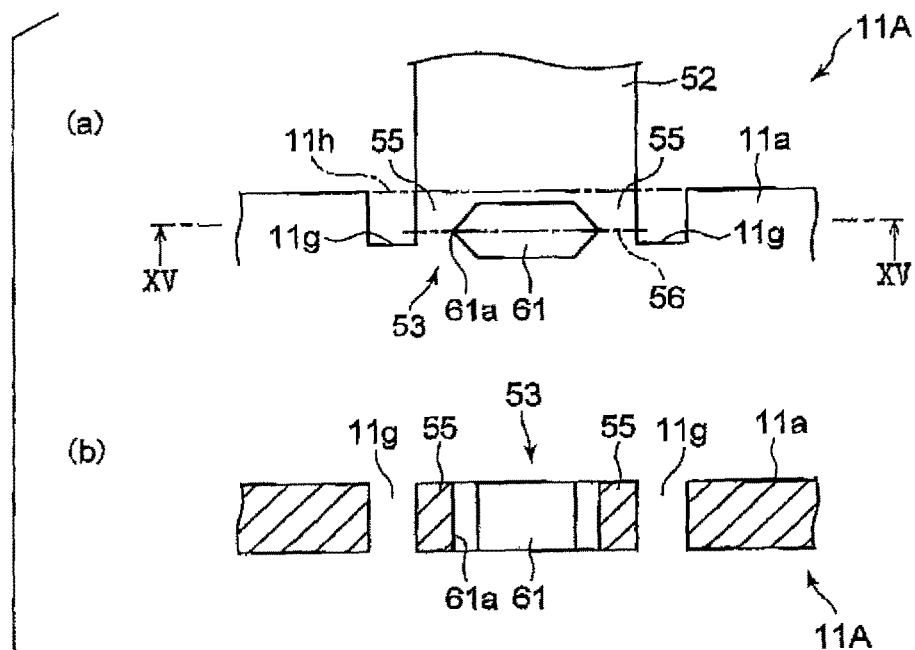
FIG. 15(a) is an enlarged plan view showing a modification of the breaking region.
FIG. 15(b) is a cross-sectional view taken along the line XV-XV in FIG. 15(a).
Figure 16:
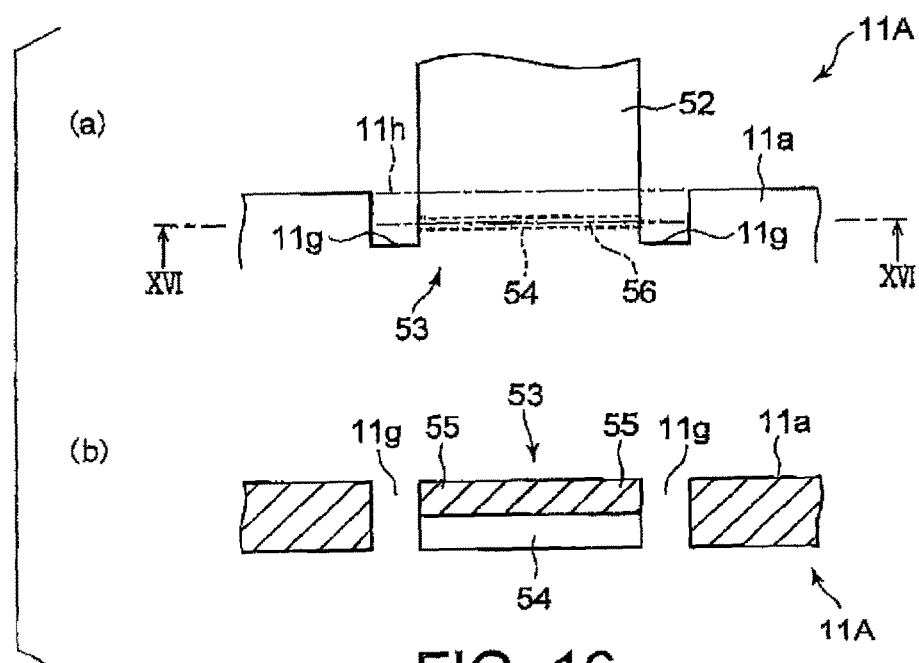
FIG. 16(a) is an enlarged plan view showing another modification of the breaking region.
FIG. 16(b) is a cross-sectional view taken along the line XVI-XVI in FIG. 16(a).

Incidentally, parts in FIGS. 15 and 16 identical with those in FIGS. 1-14 are assigned the already used reference characters and detailed explanation thereof is omitted for brevity.

It is also possible to properly combine components disclosed in the above embodiments as the need arises, or to remove some components from all the components described in the above embodiments.

The invention claimed is:

1. A leaf spring frame member for the manufacture of leaf springs used for drive mechanisms of camera modules, comprising:
   a plurality of leaf spring product parts each of which includes an outer frame part, an inner frame part arranged on the inside of the outer frame part, and a spring part arranged between the inner frame part and the outer frame part; and
   a support frame which is arranged around the leaf spring product parts and supports the leaf spring product parts,
   wherein each of the leaf spring product parts is connected at its corresponding outer frame part to the support frame by connection parts, and for each of the leaf spring product parts:
      notches are formed in parts of each of the outer frame parts situated on both sides of each of the connection parts, and
      a breaking region, which is breakable, is formed in each of the connection parts such that an outer edge of each breaking region is situated on the inside of an outer edge of each of the leaf spring product parts and extends past the notches toward the inside of the outer edge of each leaf spring product part.

2. The leaf spring frame member according to claim 1, wherein each of the breaking regions includes a half etching part.

3. The leaf spring frame member according to claim 2, wherein a bank part, which has not undergone half etching, is formed on each side of each of the half etching parts.

4. The leaf spring frame member according to claim 3, wherein the width of each of the bank parts is over 0 mm and not more than 0.12 mm.

5. The leaf spring frame member according to claim 1, wherein the width of a connection portion of each of the connection parts that connects the connection part to the corresponding leaf spring product part is not less than 0.20 mm and not more than 0.40 mm.

6. A leaf spring frame member for the manufacture of leaf springs used for drive mechanisms of camera modules, comprising:
   a plurality of leaf spring product parts each of which includes an outer frame part, an inner frame part arranged on the inside of the outer frame part, and a spring part arranged between the inner frame part and the outer frame part; and
   a support frame which is arranged around the leaf spring product parts and supports the leaf spring product parts,
   wherein each of the leaf spring product parts is connected at its corresponding outer frame part to the support frame by connection parts, and for each of the leaf spring product parts:
      notches are formed in parts of each of the outer frame parts situated on both sides of each of the connection parts, and a breaking region, which is breakable, is formed in each of the connection parts such that a part, where a width of each breaking region in the width direction of each connection part reaches a maximum, is situated on the inside of an outer edge of each leaf spring product part, each breaking region extending past the notches toward the inside of the outer edge of each leaf spring product part.

7. The leaf spring frame member according to claim 6, wherein each of the breaking regions includes a half etching part.

8. The leaf spring frame member according to claim 7, wherein a bank part, which has not undergone half etching, is formed on each side of each of the half etching parts.

9. The leaf spring frame member according to claim 8, wherein the width of each of the bank parts is over 0 mm and not more than 0.12 mm.

10. The leaf spring frame member according to claim 6, wherein the width of a connection portion of each of the connection parts that connects the connection part to the corresponding leaf spring product part is not less than 0.20 mm and not more than 0.40 mm.

\* \* \* \* \*